(12) United States Patent
Muraisi

(10) Patent No.: US 12,556,908 B1
(45) Date of Patent: Feb. 17, 2026

(54) ENCRYPTION DEVICE AND METHOD FOR SATELLITE PHONE

(71) Applicant: Fatah Muraisi, Tampa, FL (US)

(72) Inventor: Fatah Muraisi, Tampa, FL (US)

( * ) Notice: Subject to any disclaimer, the term of this patent is extended or adjusted under 35 U.S.C. 154(b) by 528 days.

(21) Appl. No.: 18/092,458

(22) Filed: Jan. 3, 2023

(51) Int. Cl.
*H04W 12/03* (2021.01)
*H04W 8/22* (2009.01)
*H04W 12/71* (2021.01)

(52) U.S. Cl.
CPC .............. *H04W 12/03* (2021.01); *H04W 8/22* (2013.01); *H04W 12/71* (2021.01)

(58) Field of Classification Search
None
See application file for complete search history.

(56) References Cited

U.S. PATENT DOCUMENTS 5,552,897 A * 9/1996 Mandelbaum ............ H04L 9/08
380/243
2013/0179692 A1 * 7/2013 Tolba ................. H04L 63/0861
713/179

FOREIGN PATENT DOCUMENTS

CN          209526781 U  * 10/2019
WO       WO-2013178117 A1 * 12/2013 ............. G06F 21/73

* cited by examiner

*Primary Examiner* — Jinsong Hu
*Assistant Examiner* — Alexander J Yi
(74) *Attorney, Agent, or Firm* — Gulf Coast Intellectual Property Group

(57) ABSTRACT

An encryption device and method that provides encryption and decryption of communications occurring between a first phone and a second phone wherein each phone has a device of the present invention operably coupled thereto. The device of the present invention is configured to be operably coupled to a satellite phone and includes a processor providing control of all of the commands and functions thereof. The device includes a converter module configured to convert analog audio data to digital data packets. An encryption module and a decryption module are configured to provide encryption and decryption of the digital data packets. The converter module is further operable to convert decrypted digital data packets to analog audio for broadcast from a speaker onboard the phone. The device is further configured to operate on a phone having a IMEI that matches an IMEI that has been stored in the device.

6 Claims, 4 Drawing Sheets

ENCRYPTION DEVICE AND METHOD FOR SATELLITE PHONE

FIELD OF THE INVENTION

The present invention relates generally to satellite phone security, more specifically but not by way of limitation, a device configured to be operably coupled to a satellite phone wherein the device facilitates encryption and decryption of voice and message data to another satellite phone also having the device of the present invention installed.

BACKGROUND

Satellite phone systems can be classified into two types: systems that use satellites in a high geostationary orbit and systems that use satellites in low Earth orbit. Some satellite phones use satellites in geostationary orbit wherein the geostationary orbit system can maintain near-continuous global coverage with a fairly low quantity of satellites. Utilization of the geostationary orbit satellites will typically result in a noticeable delay while making a phone call or using data services due to the orbital height of the satellites. Satellite phones may utilize satellites that are in low Earth orbit. The low Earth orbit system provides advantages that include the possibility of providing worldwide wireless coverage with no gaps. Low Earth orbit satellites orbit the Earth at high-speed low altitude with a typical orbital time of seventy to one hundred minutes. In these systems approximately forty to seventy satellites are required to provide consistent coverage for phones communicably coupled to the network Two current satellite network systems are commercially available that are based out of the United States. Globalstar network is a network covering most of the world that currently employs approximately forty eight satellites. One drawback to this system is that many areas of the Earth's surface are left without coverage, since a satellite requires to be in range of an Earth station gateway. The second satellite network commercially available is the Iridium network. This network operates sixty-six satellites and includes broader coverage that the Globalstar network. Iridium network utilizes radio cross-links between satellites to relay data to the nearest satellite with a connection to an Earth station. While satellite phones have grown in popularity, the largest demographic of users is still the military and government. One issue remains with the security of the satellites phones and networks. All modern satellite phone networks encrypt voice traffic to prevent eavesdropping. However, within the last decade a group of academic security researchers reverse engineered the two major proprietary encryption algorithms in use. One algorithm is a variant of the A5/2 algorithm used in GSM and was found to be vulnerable to attacks. The GMR-2 standard introduced a new encryption algorithm which the same research team also hacked successfully. While encryption technology exists, there is a need for additional encryption of satellite phones especially when utilized used for high-security applications.

It is intended within the scope of the present invention to provide a device that is operably coupled to a satellite phone wherein the device of the present invention provides encryption and decryption of communication between two satellite phones having the device of the present invention operably coupled thereto.

SUMMARY OF THE INVENTION

It is the object of the present invention to provide a device configured to be operably coupled to a satellite phone to provide encryption and decryption of communications wherein the present invention includes a module having a housing with electronics disposed therein that is configured to physically and communicably couple to a satellite phone.

Another object of the present invention is to provide a device and method of use for providing encryption and decryption of communications between two satellite phones having the device of the present invention operably coupled thereto wherein method of the present invention includes reading and recording of the IMEI (International Mobile Equipment Indentity) number of the phone to which the device is couple in order to establishing a pairing and inhibit utilization of the device on another satellite phone.

A further object of the present invention is to provide a device configured to be operably coupled to a satellite phone to provide encryption and decryption of communications wherein the present invention is capable of storing four different AES 128 or AES 256 encryption keys that are programmable by the user of the device.

Still another object of the present invention is to provide a device and method of use for providing encryption and decryption of communications between two satellite phones having the device of the present invention operably coupled thereto wherein method of the present invention includes communication encryption and decryption for only satellite phones having the device of the present invention operably coupled thereto.

An additional object of the present invention is to provide a device configured to be operably coupled to a satellite phone to provide encryption and decryption of communications wherein the method of the present invention receives analog audio from the satellite phone and converts into a digital format.

Yet a further object of the present invention is to provide a device and method of use for providing encryption and decryption of communications between two satellite phones having the device of the present invention operably coupled thereto wherein the method of present invention includes producing static or similar sound for the recipient of a call made from a satellite phone equipped with the present invention to a phone without the device of the present invention.

Another object of the present invention is to provide a device configured to be operably coupled to a satellite phone to provide encryption and decryption of communications wherein the present invention inhibits receipt of an unencrypted call from a satellite phone unless the device of the present invention is disabled.

An alternate object of the present invention is to provide a device and method of use for providing encryption and decryption of communications between two satellite phones having the device of the present invention operably coupled thereto wherein device of the present invention includes an independent power supply and an independent power switch.

Still a further object of the present invention is to provide a device configured to be operably coupled to a satellite phone to provide encryption and decryption of communications wherein the device of the present invention utilizes a suitable electronic to convert digital data back to analog voice data to produce intelligible audio.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
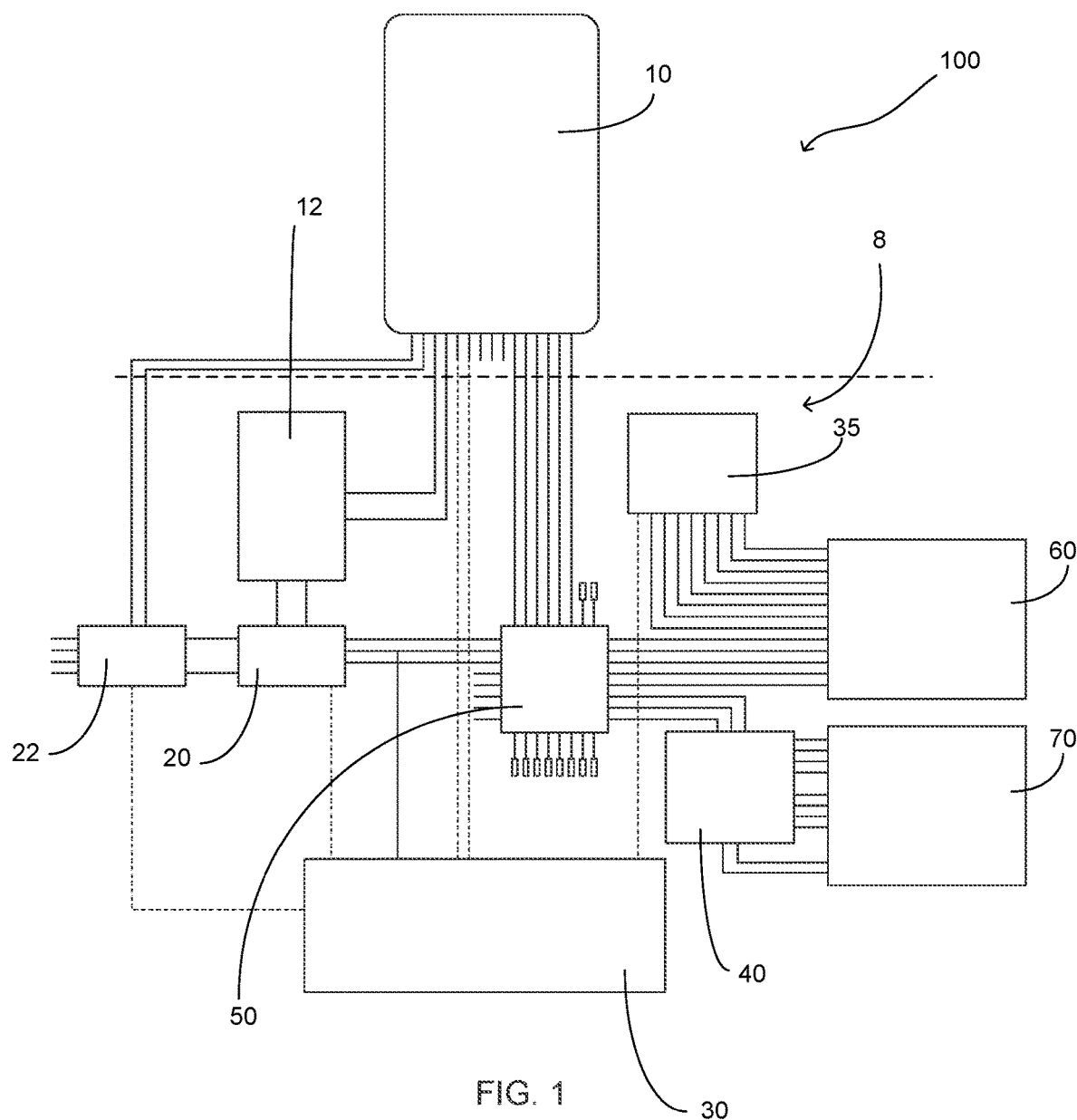
FIG. 1 is a schematic diagram of the present invention.

Referring now to the drawings submitted herewith, wherein various elements depicted therein are not necessarily drawn to scale and wherein through the views and figures like elements are referenced with identical reference numerals, there is illustrated an encryption device and method 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Now referring to the drawings submitted herewith, the encryption device and method 100 includes a device that is operably coupled to a compatible phone. While the preferred embodiment of the present invention couples to an Iridium Satellite phone, it is contemplated within the scope of the present invention that the present invention could be produced to couple to alternate phone models and types. While not particularly illustrated herein, it should be understood that the components illustrated in FIG. 1 herein are housed in a conventional plastic housing that is designed to physically couple to a phone. It should be understood within the scope of the present invention that the housing could be provided in various sizes and shapes dependent upon the type of phone to which the present invention is connected.

In FIG. 1, the phone 10 is represented in block diagram format in the schematic and the device 8 of the encryption device and method 100 is illustrated in schematic form being below the dotted line in FIG. 1. Phone 10 is electronically coupled to battery 12 wherein the battery 12 is disposed within the housing of the device 8. It is contemplated within the scope of the present invention that the battery 12 is charged and/or augmented by a battery that is integrated within the phone 10. It should be understood within the scope of the present invention that the battery 12 could be various types of batteries as well as the device 8 could be configured with an independent power switch so as to provide an ability to power on and off the device 8. The battery 12 is operably coupled to voltage regulator 20 and charging module 22. Voltage regulator 20 functions to manage voltage regulation for the device 8 while the charging module 22 provides charging to the device 8.

Processor 30 is a conventional microprocessor that includes the necessary electronics to receive, store, manipulate and transmit data. Processor 30 is operably coupled to phone 10 and provides all command function control of the device 8 during use thereof. The device 8 further includes a first audio input module 35. The first audio input module 35 provides control of use of external audio input/output and is configured to be coupled thereto with a 3.5 mm jack. The device 8 includes a second audio input control module 40. The second audio input control module 40 includes the necessary electronics to provide use and control of onboard audio input/output integrated into the phone 10.

Converter module 50 is operably coupled to phone 10 as well as the first audio control module 35 and second audio control module 40. The converter module 50 is configured to convert audio analog input to digital audio packets during use of the encryption device and method 100. Operably coupled to the first audio control module 35 and second audio control module 40 is the encryption module 60 and decryption module 70. The encryption module 60 is configured to encrypt audio input wherein the audio encryption utilizes either an AES 128 or AES 256 encryption key. While the device 8 defaults to an encryption key, the device 8 is programmable and can receive and store up to four different encryption keys that are either AES 128 or AES 256. The user can select which encryption key to employ during utilization of the phone 10. The decryption module 70 functions to decrypt incoming audio wherein the decrypted audio is converted back to analog data and broadcast through the audio output on the phone 10 as is further discussed herein.

Figure 2:
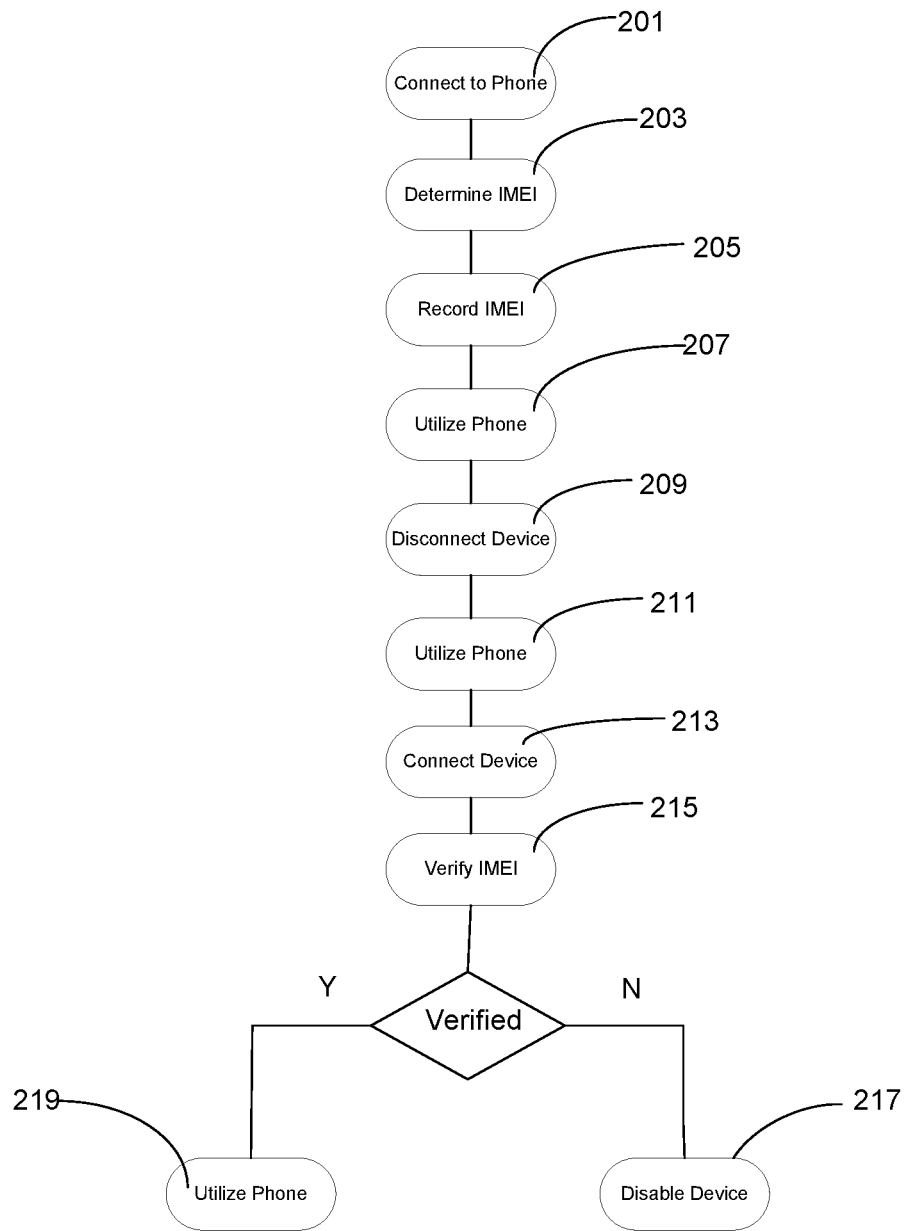
FIG. 2 is a flow chart for the process of connecting the present invention to a compatible phone.

Referring now to FIG. 2 submitted herewith, the process of coupling the device 8 to a phone 10 is outlined therein. In step 201, the device 8 is operably coupled to the phone 10. Step 203, when the device 8 is initially coupled to the phone 10 the device 8 will determine the IMEI of the phone 10 to which the device 8 is being coupled. In step 205, the IMEI of the phone 10 to which the device 8 has been coupled is stored within the processor 30. Step 207, the user will utilize the phone 10 to make audio calls. In step 209, when desired the user will disconnect the device 8 from the phone 10. Step 211, the user will utilize the phone 10 as needed. In step 213, the user will connect the device 8 to the phone 10. Step 215, the processor 30 will execute verification of the IMEI of the phone 10 to which the device 8 has been coupled to determine if the IMEI of the phone 10 matches the stored IMEI stored in the processor 30. Step 217, if the IMEI of the phone 10 does not match the IMEI stored in the processor 30, the device 8 is disabled and rendered inoperable. In step 219, if the IMEI of the phone 10 matches the IMEI stored in the processor 30, then the user can proceed with utilizing the phone 10 having the device 8 operably coupled thereto.

Figure 3:
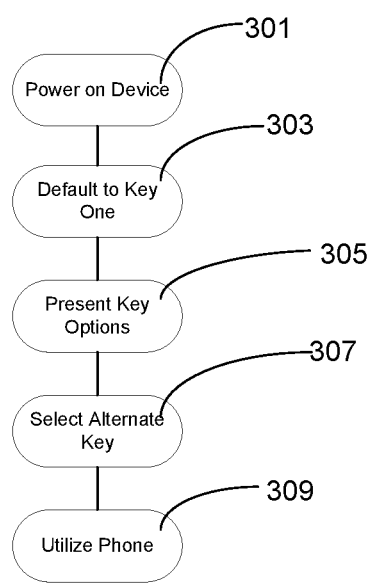
FIG. 3 is a flow chart for the activation process of the present invention.

Referring now to FIG. 3, an outline is diagrammed therein of the activation procedure of the encryption device and method 100. In step 301, ensuing coupling the device 8 to the phone 10, the device 8 is placed into an on position. It should be understood within the scope of the present invention that the device 8 could be powered on and off with the phone 10 power or have an independent power switch controlling the on/off of the device 8. Step 303, the device 8 will default to an encryption key. In step 305, the user is presented via the graphical interface of the phone 10 a selection of encryption key options if alternate encryption keys were programmed into the device 8. Step 307, if desired the user will select an alternate encryption key. In step 309, the user will proceed with utilization of the phone 10 as needed.

Figure 4:
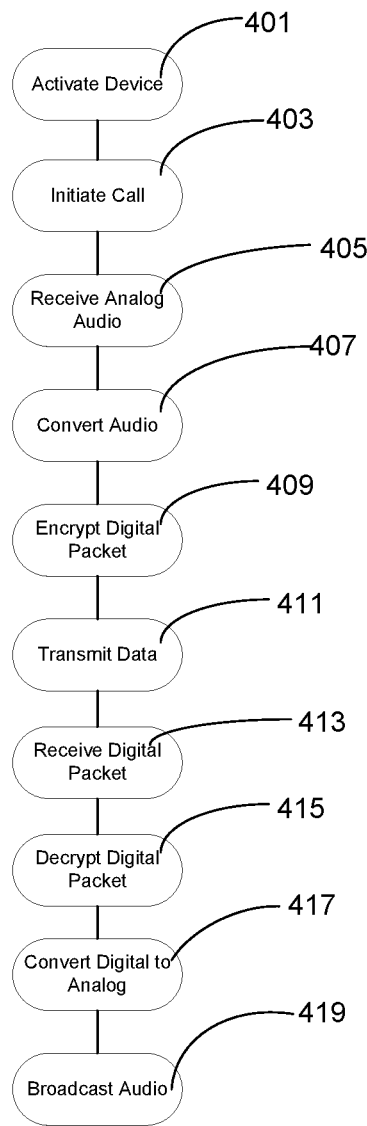
FIG. 4 is a flow chart for the call flow process of the present invention.

Referring now to FIG. 4 submitted as a part hereof, the encryption device and method 100 includes a phone call transmission procedure that is outlined therein. Step 401, the user will activate the device 8 as discussed herein. In step 403, user initiates a phone call with the phone 10. Step 405, the converter module 50 will receive the analog audio data from either the first audio input module 35 or the second audio input module 40. In step 407, the received analog audio data is converted into digital data packets by the converter module 50. Step 409, the digital data packet is encrypted utilizing the encryption key by the encryption module 60. In step 411, the digital data packet is transmitted to another phone via the communication network to which the phone 10 is communicably coupled. Step 413, the receiving phone receives the digital data packet. The receiving phone has operably coupled thereto a device 8. In step 415, the device 8 on the receiving phone employs the decryption module 70 to decrypt the digital data packet. Step 417, the converter module 50 will receive the decrypted digital data packet from the decryption module 70 and convert the digital data packet to analog audio. In step 419, the analog audio will be transmitted to and broadcast from a speaker in the phone 10.

The encryption device and method 100 provides additional security for phone calls that are made with a phone 10 having a device 8 operably coupled thereto and vice versa. The programming of the device 8 is such that when a phone call is initiated from a phone 10 with a device 8 to a second phone wherein the second phone has no device 8, the transmitting phone 10 and device 8 recognize the lack of a second device 8 on the receiving phone and the call transmission is interrupted and the calling user will only hear static or other similar sound and be unable to conduct a phone call with intelligible audio. Additionally, if a user of a phone 10 having a device 8 operably coupled thereto receives an incoming phone call transmission from a phone that has no device operably coupled thereto, the receiving phone has the audio output thereof suspended and no audio can be heard by the user.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A method for providing encryption and decryption of a phone call transmission between a first phone and a second phone,
   wherein the method comprises the steps of:
   providing a first encryption device, said first encryption device being operably coupled to said first phone, said first encryption device having a first processor,
   said first processor being operable to receive, store, transmit and manipulate data, said first processor providing operations of said first encryption device,
   said first encryption device further including a first convertor,
   said first convertor operable to convert analog audio data to digital data packets,
   said first encryption device having a first audio input module operable to receive audio data from a first microphone on said first phone,
   said first encryption device further including an first encryption module,
   said first encryption module operably coupled to said first convertor,
   said first encryption module operable to encrypt the digital data packets,
   said first encryption module operably coupled to said first audio input module,
   said first encryption device further including a first decryption module,
   said first decryption module being operably coupled to said first audio output module,
   said first decryption module further being operably coupled to said first convertor, said first decryption module operable to decrypt incoming digital data packets and transfer to said first convertor;
   connecting the first encryption device to the first phone;
   determining a first IMEI (International Mobile Equipment Identity) of the first phone, wherein the first encryption device ascertains and records the first IMEI of the first phone in the first processor;
   initiating a phone call, wherein a user will employ the first phone to transmit an audio phone call;
   receiving analog audio data, wherein the first convertor module of the first encryption device receives audio data from the first audio input module of the first encryption device, and
   wherein the first convertor module of the first encryption device converts the analog audio data to digital data packets;

encrypting the digital data packets, wherein the first encryption module of the first encryption device encrypts the digital data packets;

transmitting the digital data packets, wherein the first phone transfers the digital data packets to the second phone;

detecting a presence of a second encryption device being operably coupled to the second phone;

confirming the presence of the second encryption device, wherein the second encryption device transmits a signal of presence to the first encryption device, said second encryption device having a second processor, said second processor of said second encryption device being operable to receive, store, transmit and manipulate data, said second processor of said second encryption device providing operations of said second encryption device, said second encryption device further including a second convertor, said second convertor of said second encryption device operable to convert analog audio data to digital data packets, said second encryption device having a second audio input module operable to receive audio data from a second microphone on said second phone, said second encryption device further including an encryption module, said second encryption module of said second encryption device operably coupled to said second convertor of said second encryption device, said encryption module of said second encryption device operable to encrypt the digital data packets, said second encryption module of said second encryption device operably coupled to said second audio input module of said second encryption device, said second encryption device further including the second encryption module, said second encryption module of said second encryption device being operably coupled to said second audio input module of said second encryption device, said second encryption module of said second encryption device further being operably coupled to said second convertor of said second encryption device, said second decryption module of said second encryption device operable to decrypt incoming digital data packets and transfer to said second convertor of said second encryption device;

permitting completion of transmission of the digital data packets from said first phone to said second phone subsequent to confirmation of detection of said second encryption device on said second phone;

receiving the digital data packets, wherein the second phone receives the digital data packets from the first phone;

decrypting the digital data packets, wherein the second decryption module of the second encryption device decrypts the received digital data packets;

converting the digital data packets to analog audio data, wherein the second convertor of the second encryption device converts the digital data packets to analog audio data;

broadcasting the analog audio data on the second encryption device an audio output on the second phone;

further including a step of validating the first IMEI of the first phone, wherein the first encryption module compares the recorded first IMEI to the first IMEI of the first phone to ensure equivalency between the recorded first IMEI and the first IMEI of the first phone; and further including a step of disabling the first phone, wherein the first encryption module is disabled upon a detection of the first IMEI of the first phone being not equal to the recorded first IMEI stored in the first encryption device.

2. The method for providing encryption and decryption of a phone call transmission between a first phone and a second phone as recited in claim 1, wherein the first encryption device and the second encryption device provide encryption keys selected from one of the following: AES 128 or AES 256.

3. The method for providing encryption and decryption of a phone call transmission between a first phone and a second phone as recited in claim 1, and further including a step of producing a static sound ensuing a call transmission attempt, wherein the first encryption device will produce a static sound upon the first phone calling the second phone void of an encryption device.

4. The method for providing encryption and decryption of a phone call transmission between a first phone and a second phone as recited in claim 1, and further including a step of producing no intelligible audio, wherein ensuing receipt of a call on the first phone from the second phone without an encryption device the first encryption module will produce no intelligible audio.

5. The method for providing encryption and decryption of a phone call transmission between a first phone and a second phone as recited in claim 1, and further including a step of presenting encryption key options, wherein the first encryption device and the second encryption device present to the user an alternative option for the encryption key.

6. The method for providing encryption and decryption of a phone call transmission between a first phone and a second phone as recited in claim 5, and further including a step of selecting an alternate encryption key, wherein the user will select an alternate encryption key presented thereto.

* * * * *